June 22, 1965            W. L. BROWN            3,190,981
DIRECTIONAL SIGNAL CANCELING MECHANISM RESPONSIVE TO RELATIVELY
LARGE OR RELATIVELY SMALL TURNING MOVEMENTS
OF THE VEHICLE'S STEERING APPARATUS
Filed April 20, 1961            2 Sheets-Sheet 1

INVENTOR.
William L. Brown
BY
Learman, Learman & McCulloch
ATTORNEYS

June 22, 1965  W. L. BROWN  3,190,981
DIRECTIONAL SIGNAL CANCELING MECHANISM RESPONSIVE TO RELATIVELY
LARGE OR RELATIVELY SMALL TURNING MOVEMENTS
OF THE VEHICLE'S STEERING APPARATUS
Filed April 20, 1961  2 Sheets-Sheet 2

INVENTOR.
William L. Brown
BY
Learman, Learman & McCulloch
ATTORNEYS

United States Patent Office 3,190,981
Patented June 22, 1965

3,190,981
DIRECTIONAL SIGNAL CANCELING MECHANISM RESPONSIVE TO RELATIVELY LARGE OR RELATIVELY SMALL TURNING MOVEMENTS OF THE VEHICLE'S STEERING APPARATUS
William L. Brown, Garden City, Mich., assignor to Boyne Products, Inc., Boyne City, Mich., a corporation of Michigan
Filed Apr. 20, 1961, Ser. No. 104,380
8 Claims. (Cl. 200—61.34)

This invention relates to direction signaling apparatus for motor vehicles and more particularly to an automatically operable mechanism for canceling the direction signals.

Most of the direction signaling devices currently in use on passenger vehicles are manually adjustable from a neutral or inactive position to an operating position so as selecitvely to cause the signaling lights at the left or right hand side of the vehicle to flash and indicate the direction in which the vehicle is to turn. Such devices ordinarily are associated with cams or dogs which rotate in response to rotation of the vehicle's steering wheel and which are adapted to engage a part of the direction signaling apparatus and restore the latter to its neutral position upon turning movement of the steering wheel in a direction to straighten the front wheels of the vehicle following the completion of a turn. In order to avoid premature canceling of the turning signals, the cams or dogs usually are angularly spaced a substantial distance from the return part of the signaling apparatus. As a result, cancellation of turn signals usually requires rotation of the steering wheel through a relatively large arc such as, for example, 55° or more. In many instances the direction signaling apparatus will be actuated to indicate a turn, but the turn will be of such a gentle nature that the return arc of rotation of the steering wheel will be insufficient to cause canceling of the signal. In other instances the signaling apparatus may be actuated inadvertently. Unless the driver of the vehicle is alert or later makes a turn of sufficient magnitude to effect cancellation of the signal, the vehicle may be driven for many miles with the signal lights flashing.

It is well known that the driver of a vehicle more or less constantly turns the vehicle's steering wheel back and forth through relatively small arcs, even when driving along a straight road. In addition, movements are imparted to the steering wheel in order to negotiate curves and when passing other vehicles. One of the principal objects of this invention is to provide mechanism which is operable in response to such movements of a vehicle's steering apparatus to effect cancellation of the vehicle's turn signals.

Another object of this invention is to provide canceling mechanism for direction signaling apparatus and which is responsive either to relatively large or relatively small turning movements of the vehicle's steering apparatus to effect automatic cancellation of the turn signals.

Another object of the invention is to provide direction signal canceling mechanism which is adapted for use in conjunction with signaling apparatus currently in use.

A further object of the invention is to provide direction signal canceling mechanism of the character described which is capable of effecting cancellation of either a left hand or a right hand signal.

Another object of the invention is to provide direction signal canceling mechanism which is operable in response to the accumulation of a number of small arc oscillations of a vehicle's steering mechanism to effect automatic cancellation of a turn signal.

A further object of the invention is to provide mechanism of the class described which is economical to manufacture, assemble, and service and which is rugged and durable in use.

Other objects and advantages of the invention will be pointed out in detail or will become apparent from the following description when it is considered in conjunction with the appended claims and the accompanying drawings, in which:

Figure 1:
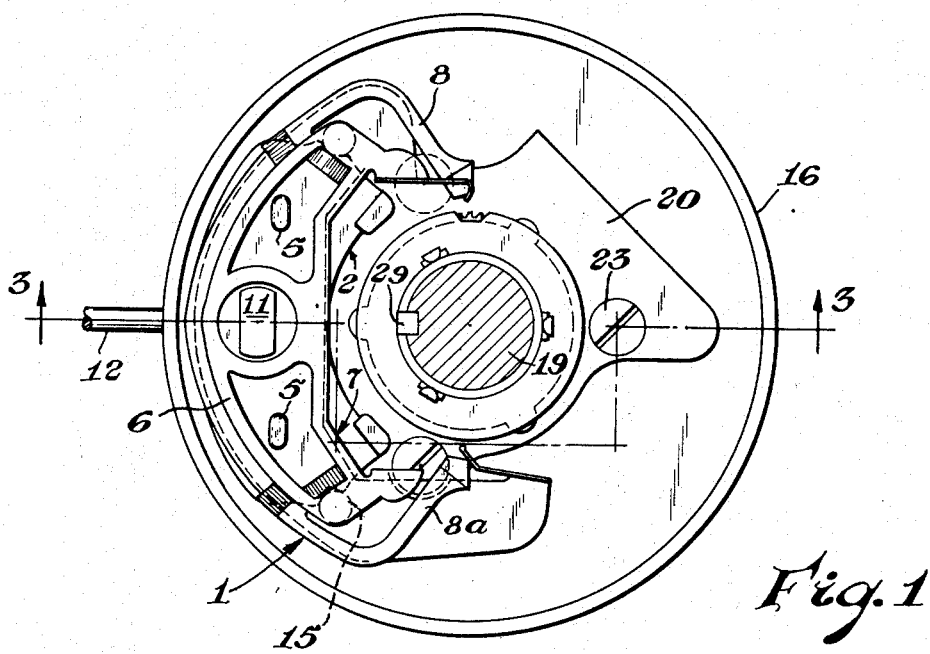
FIGURE 1 is a view partly in top plan and partly in section of apparatus constructed in accordance with the invention and illustrating the direction signaling apparatus in its neutral or inactive position.

Apparatus constructed in accordance with the invention is adapted for use in conjunction with direction signaling apparatus 1 of the kind disclosed in co-pending application Serial No. 797,266, filed March 4, 1959, now Patent No. 2,999,911. The apparatus 1 comprises a switch casing 2 formed of molded nylon or the like and in which a pair of movable switch blocks 3 are slideably mounted, one of the blocks being shown in FIGURE 2. Each of the switch blocks 3 includes an upstanding projection 4 which extends above the casing 2 for reception in a correspondingly positioned socket 5 formed in the body 6 of a molded switching or actuating member 7 which is positioned atop the casing 2. The body 6 of the actuating member terminates at one end in an integral, molded return finger 8, and at the other end in a similar finger 8a, the fingers 8, 8a extending toward one another along converging lines. Means mounting the actuating member 7 comprises an operating shaft 9 having a cylindrical part 10 that is journaled for rotation in the casing 2 and terminating at one end in a rectangular part 11 which is received in a correspondingly shaped opening in the switching member 7. An operating lever 12 may be fixed to the shaft 9 to rock the latter and effect movement of the switching member 7 from its neutral position, indicated in FIGURE 1, to operating positions on opposite sides of the neutral position. Upon relative movement of the switching member 7 and the casing 2, the switch blocks 3 will be shifted to effect energization of either the left hand of the right hand signaling lamps, depending on the direction of movement of the switching member, as is more fully explained in the aforementioned patent. The ends of the casing 2 are provided with integral ribs 13 having detents 14 formed therein, and the switching member 7 is provided with a pair of detent posts 15 which cooperate with the detents 14 and yieldably hold the member 7 in any selected position.

Figure 2:
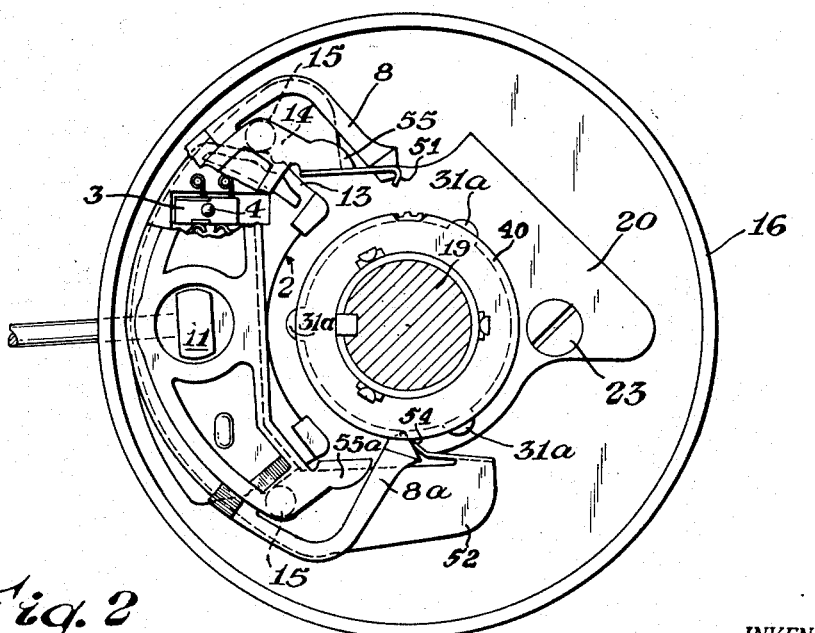
FIGURE 2 is a view similar to FIGURE 1 and illustrating the signaling device adjusted to indicate a left hand turn, certain of the parts being broken away.
Figure 3:
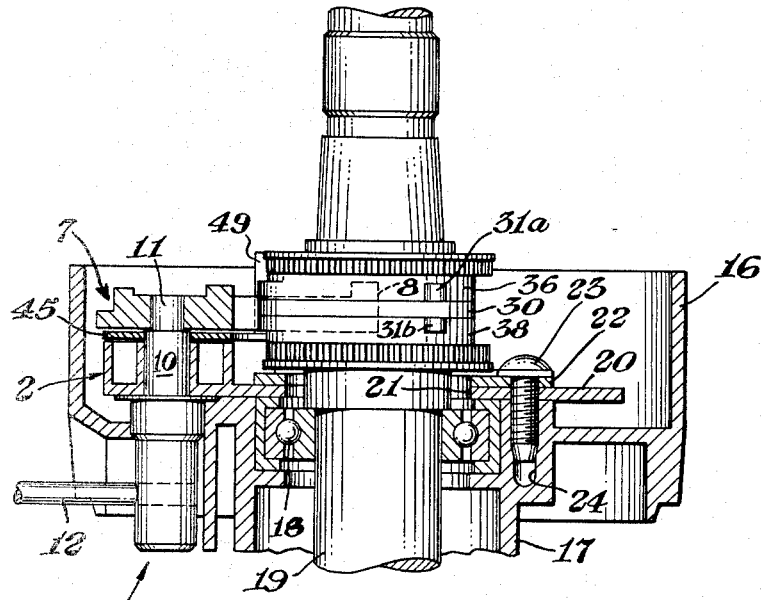
FIGURE 3 is a sectional view taken on the line 3—3 of FIGURE 1.

The apparatus described thus far is adapted to be mounted in a housing 16 that is fixed adjacent the upper end of a column 17 (FIGURE 3) in which is rotatably journalled, by means of bearings 18, a rotatable steering shaft or member 19 ot the upper end of which a steering wheel (not shown) may be fixed. The manner in which the apparatus is installed in the housing will vary from one kind of vehicle to another, but FIGURES 1–3 illustrate a typical installation wherein the casing 2 includes a mounting flange 20 that is centrally apertured as at 21 to accommodate the shaft 19 and which may seat upon the base of the housing 16. An anchor ring 22 may overlie the flange 20 and clamp the latter in place by means of screws 23 which pass through openings in the ring 22 and the flange 20 and are received in threaded openings 24 formed in the housing.

Canceling mechanism formed in accordance with the invention is designated generally by the reference character 25 and comprises a canceling assembly 26 carried by the steering shaft 19 and cooperable indexing or ratchet means 27 operable in response to movement of the switching member 7 to either of its operating positions. The assembly 26 comprises a sleeve 28 that is adapted to receive the steering shaft 19 and be fixed to the latter by means of a key 29. Intermediate its ends the sleeve 28 is provided with an external flange 30 having at least one canceling cam lobe or member 31 projecting radially therefrom, the lobe 31 hereinafter sometimes being referred to as the first canceling member. The outer face of the sleeve is provided with an axially extending groove 32 that extends on both sides of the flange 30. On one side of the flange 30 is a coil 33 of spring wire having one of its ends 34 trapped in the groove 32, its other end being free. A similar coil 35 surrounds the sleeve 28 on the opposite side of the flange 30 and has the end adjacent the flange 30 trapped in the groove 32. The coils 33 and 35 are identical except that the coil 33 spirals counterclockwise from its trapped end 34, whereas the coil 35 spirals clockwise from its correspondingly trapped end. The purpose of this construction will be pointed out subsequently.

Figure 4:
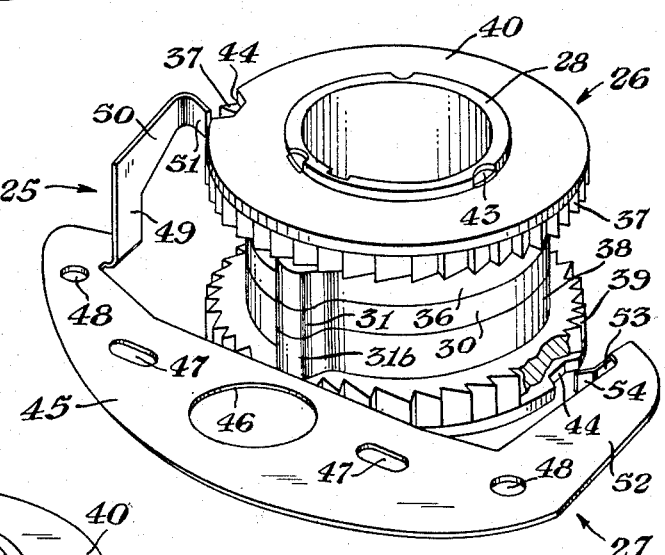
FIGURE 4 is an isometric view illustrating the indexing and canceling mechanism forming part of the invention.
Figure 5:
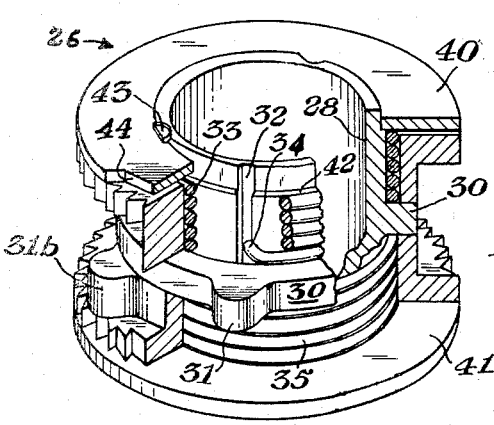
FIGURE 5 is an isometric view of a part of the apparatus shown in FIGURE 4, with certain parts being broken away.

Forming part of the assembly 26 and mounted on the sleeve 28 on opposite sides of the flange 30 is auxiliary canceling means comprising first and second annular, flanged ratchet wheels 36 and 38. The flange of the wheel 36 has a number of uniformly spaced ratchet teeth 37 formed therein and the flange of the ratchet wheel 38 has ratchet teeth 39 formed therein. As is best indicated in FIGURES 4 and 5, the teeth 37 and 39 are oppositely pitched or inclined for a reason presently to be explained. The wheel 36 includes one or more radially projecting, second canceling cam lobes 31a, similar to the cam lobe 31, and the wheel 38 includes a corresponding number of third canceling cams 31b. There are three uniformly spaced cams 31a and 31b disclosed in the drawings, but the number of such cams may vary.

The interior diameter of each of the ratchet wheels 36 and 38 is larger than the outer diameter of the sleeve 28 so as to permit the coils 33 and 35 snugly to be received between the sleeve 28 and the respective ratchet wheels. The coils 33 and 35 are gripped snugly between the respective ratchet wheels and the sleeve 28, but each of the ratchet wheels is capable of rotation relative to the sleeve 28. Each of the coils 33 and 35 inherently tends to unwind, but cannot do so because of the ratchet wheels associated therewith. The direction of spiral of the coil 33 and its tendency to unwind cause the coil to exert a force on the ratchet wheel 36 which opposes its rotation relative to the sleeve 28 in a clockwise direction, as viewed in FIGURE 4. The wheel 36 is nevertheless free to rotate relatively to the sleeve in a counterclockwise direction. The direction of spiral of the coil 35 is such as to cause the latter to oppose rotation of the ratchet wheel 38 relative to the sleeve 28 in a counter-clockwise direction, but the wheel 38 is rotatable relatively to the sleeve in a clockwise direction. The coils 33 and 35, therefore, constitute unidirectional clutch means which permit rotation of the ratchet wheels 36 and 38 both with and relative to the sleeve, but in opposite directions. The coils 33 and 35 represent only one form of unidirectional clutch device that can be employed and it will be understood that any other suitable one-way clutch mechanism may be substituted for the clutches shown.

The ratchet wheels 36 and 38 are maintained in assembled relation with the sleeve 28 by means of rings 40 and 41 which seat on shoulders 42 formed adjacent opposite ends of the sleeve 28 and which are suitably fixed to the sleeve as by staking, as is indicated at 43. Each of the rings 40 and 41 has an outer diameter that is at least as great as the maximum tooth diameter of each of the ratchet wheels and each of the rings is provided with a notch 44 in its periphery for a purpose which will be pointed out hereinafter. When the parts are assembled, the notches 44 will be positioned on opposite sides of the sleeve 28.

The indexing means 27 comprises a body member 45 which corresponds substantially to the shape of the body 6 of the switching member 7. The device 27 preferably is a stamping of spring steel or the like and which is relatively thin so as to permit it to be sandwiched between the switch casing 2 and the switching member 7. The body 45 is provided with an opening 46 to accommodate the cylindrical portion 10 of the shaft 9 and is provided with a pair of slots 47 through which the projections 4 on the switch blocks 3 may extend. The body 45 also is provided with openings 48 which snugly receive the detent posts 15 so that movements of the switching member 7 will be imparted to the body 45. One end of the body member 45 is provided with an upwardly bent arm 49 which supports a flexible finger 50 that terminates at its free end in a hooked pawl 51. The other end of the body member 45 is provided with an arm 52 having a downwardly bent, flexible finger 53 that terminates at its free end in a pawl 54.

When the parts of the apparatus thus far described are assembled in the manner shown in FIGURES 1, 2, and 3, the pawl 51 will be supported at the level of the ratchet teeth 37 and the pawl 54 will be supported at the level of the ratchet teeth 39. The canceling means 26 is assembled on the steering shaft 19 of a vehicle in such manner that when the wheels of the vehicle are conditioned for straight line movement the cam 31 will be located substantially midway between the return fingers 8 and 8a and with the notches 44 in the rings 40 and 41 opposite their respective pawls 51 and 54.

Each of the return fingers 8 and 8a is of such thickness that it can be engaged by any of the cams 31, 31a and 31b, even though the cams are at different levels. As long as the switching member 7 remains in its neutral position, however, the return fingers 8 and 8a and the indexing pawls 51 and 54 are free of engagement with any part of the canceling apparatus 26.

In the event the driver of the vehicle desires to signal a turn to the left, for example, he will move the operating lever 12 counterclockwise, as viewed in FIGURE 1, to rock the switching member 7 to the position shown in FIGURE 2, thereby thrusting the free end of the return finger 8a in the path of rotation of the cams 31, 31a, and 31b. If the rotation of the steering shaft 16 counterclockwise is sufficient to move the cam 31 past the finger 8a during the making of the turn, clockwise rotation of the shaft 16 upon completion of the turn will cause the cam 31 to engage the return finger 8a and move the latter forcibly into engagement with an abutment 55a forming an integral part of the switching member 7 so as to restore the latter to its neutral position and cancel the turn signal. Should the counterclockwise rotation of the shaft 16 be an amount insufficient to move the cam 31 past the finger 8a, the clockwise rotation of the shaft 16 upon completion of the turn will not effect cancellation of the turn signal and the switching member 7 will remain in its operating position.

As has been pointed out herebefore, the detent posts 15 carried by the switching member 7 extend through the openings 48 in the indexing member 27 to effect movement of the latter upon movement of the switching member. When the switching member has been moved to one of its operating positions, therefore, the indexing member 27 also will have been moved. Thus, when the switching member is in its left turn indicating position, as shown in FIGURE 2, the pawl 54 will be in such position that it is capable of engaging the teeth 39 of the ratchet wheel 38.

Unless the notch 44 is directly opposite the pawl 54 the latter is prevented by the peripheral edge of the ring 41 from engaging the teeth 39, but when the notch 44 is opposite the pawl 54 the latter will engage the teeth 39. Thus, when the steering shaft is returned to the position it occupies when the vehicle is conditioned for straight line travel, the notch 44 will receive the pawl 54 so as to allow engagement of the latter between two of the teeth of the ratchet wheel 38. When the shaft 19 is rotated clockwise, the inclination of the teeth of the ratchet wheel 38 will permit the latter to move clockwise relatively to the pawl 54, but when the shaft is rotated counterclockwise the pawl 54 will, by engagement with the teeth 39, cause the ratchet wheel 38 to remain stationary or, stated differently, effect relative rotation between the ratchet wheel 38 and the shaft 16. Should the shaft be rotated through an arc greater than the length of the notch 44, the pawl 54 will be disengaged from the ratchet teeth by the edge of the ring 41.

As the driver of the vehicle oscillates the steering shaft the ratchet wheel 38 will be indexed incrementally in a clockwise direction relatively to the shaft 19. As the ratchet wheel 38 is indexed relatively to the shaft, one of the cams 31b will be advanced toward the return finger 8a. Eventually the cam 31b will engage the return finger 8a and restore the switching member 7 and the canceling member 27 to their neutral positions.

The amount of relative movement between the ratchet wheel and the steering shaft will depend upon the amount of rotation of the steering shaft in a counterclockwise direction and upon the length of the notch 44. It has been found that the notch can be about 10° in length, but it can be longer or shorter, as desired.

In the event the switching member 7 is moved to its right turn indicating position, the operation of the canceling mechanism will be the same as has been described for canceling a left turn signal, with the exception that the pawl 51 will react with the teeth 37 of the ratchet wheel 36 to effect incremental indexing of the latter in a counterclockwise direction relatively to the steering shaft 19.

When the switching member 7 is in either of its operating positions, rotation of the shaft 19 will cause the ratchet wheel that is not involved in the canceling of the turn signal then in operation to be restored to the position indicated in FIGURES 1 and 4. Thus, when the apparatus is conditioned to indicate a left hand turn, for example, rotation of the shaft 19 in a clockwise direction will cause one of the cams 31a to engage the finger 8a. Since the ratchet wheel 36 is freely rotatable relatively to the shaft 19 in a counterclockwise direction, the engagement of the cam 31a with the finger 8a will cause the ratchet wheel 36 to hold the ratchet wheel stationary during clockwise turning of the shaft 19 so as to realign one of the cams 31a with the cam 31. One of the cams 31b is similarly aligned with the cam 31 when the signaling apparatus is conditioned to indicate a right hand turn, but it will be understood that the ratchet wheel 38 is, in this instance, acted upon by the return finger 8.

One of the principal advantages of the construction herein disclosed is that canceling and indexing devices 26 and 27 can be incorporated with direction signaling means of the kind disclosed in the aforementioned patent, without requiring any modification of such devices. Thus, it is not necessary to redesign production model direction signals of the kind disclosed in the above identified patent in order to adapt them for use in conjunction with the accumulative mechanism herein disclosed.

The disclosed embodiment is representative of a presently preferred form of the invention but is intended to be illustrative rather than definitive thereof. The invention is defined in the claims.

I claim:

1. Direction signaling apparatus for use with a rotatable steering member having a first cam member fixed thereon for rotation therewith, said apparatus comprising a second cam member; a third cam member; unidirectional clutch means mounting said second and third cam members adjacent said steering member for rotation with said steering member and for rotation in opposite directions relative to said steering member; actuating means having a pair of return members at opposite sides of said steering member; means mounting said actuating means for movements from a neutral position in which said return members are clear of the paths of rotation of said cam members to operating positions on opposite sides of said neutral position, and return, one of said return members being located in the path of said first and second cam members when said actuating means is in one of said operating positions and the other of said return members being in the path of said first and third cam members when said actuating means is in its other operating position; and cooperable ratchet means on said actuating means and on each of said second and third cam members, the ratchet means of said second cam member being engageable with the ratchet means of said actuating means when the latter is in one of its operating positions and the ratchet means of said third cam member being engageable with the ratchet means of said actuating means when the latter is in its other operating position, engagement of the ratchet means of either of said second and third cam members with the ratchet means of said actuating means being operable to effect relative rotation between said steering member and the associated cam member toward the return member in the path of rotation thereof.

2. In direction signaling apparatus having a switching member movable from a neutral position to an operating position and having a return part located in the path of and engageable by a canceling member fixed to a rotatable steering member upon rotation of the latter through a predetermined arc for moving said switching member from its actuated position to its neutral position, the combination of: auxiliary canceling means engageable with said return part; means mounting said auxiliary canceling means for rotation with said steering member in one direction of rotation of the latter and for rotation relative to said steering member in the opposite direction of rotation of the latter; and cooperable indexing means on said switching member and on said auxiliary canceling means, said cooperable indexing means being engageable with one another when said switching member is in its operating position and operable to effect incremental relative rotation between said auxiliary canceling means and said steering member in response to back and forth rotation of the latter an amount less than said predetermined arc so as incrementally to move said auxiliary canceling means relatively to said steering member into engagement with said return part.

3. The construction set forth in claim 2 wherein said cooperable indexing means comprises a toothed element on said auxiliary canceling means and a pawl on said switching member.

4. Direction signaling apparatus adapted for use with a rotatable steering member, said apparatus comprising a switching member having a pair of return parts; means mounting said switching member adjacent said steering member with said return parts on opposite sides thereof; a pair of indexing pawl means carried by said switching member and positioned at different levels; a pair of canceling members; ratchet means carried by each of said canceling members; unidirectional clutch means mounting said canceling members on said steering member with the respective ratchet means at levels corresponding to the levels of said pair of pawl means and for rotation in opposite directions relative to said steering member; and means connected to said switching member for moving the latter and said pawl means from a neutral position to operating positions on opposite sides of said neutral position, one of said return parts being in the path of rotation of one of said canceling members when said switching member is in one of its operating positions and the other of said return parts being in the path of the other canceling member when said switching member is in its other operating position, one of said pawl means being in engagement with the ratchet means of one of said canceling members when said switching member is in an operating position and being operable to move said one of said canceling members relatively to said steering member into engagement with the associated return part.

5. Direction signaling apparatus comprising a switching member mounted for movement from a neutral position to an operating position and having return means movable therewith into the path of movable canceling cam means operable to restore said switching member to said neutral position; and cooperable indexing means comprising a first part having a connection with said cam means and a second part having a connection with said switching member and movable into engagement with said first part in response to movement of said switching member to said operating position, the engagement of said first and second parts conditioning said cam means for movement into engagement with said return means and restoration of said switching member to said neutral position.

6. Direction signaling apparatus for use with rotary steering means, said apparatus comprising canceling cam means; means mounting said cam means on said steering means for rotation with the latter in one direction of rotation thereof and for rotation relative to said steering means in the opposite direction of rotation thereof; a switching member mounted adjacent said steering member for movement from a neutral position to an operating position and having return means movable therewith into the path of rotation of said cam means; and cooperable indexing means comprising a first part having a connection with said cam means and a second part having a connection with said switching member, said second part being movable into engagement with said first part in response to movement of said switching member to said operating position, the engagement of said first and second parts conditioning said cam means for rotation relative to said steering means into engagement with said return means and restoration of said switching member to said neutral position.

7. Direction signaling apparatus for use with rotatable steering means, said apparatus comprising first canceling cam means; second canceling cam means; means mounting said first and second canceling cam means on said steering means for rotation therewith and for rotation in opposite directions relative to said steering means; a switching member mounted adjacent said steering means for movement from a neutral position to either of two operating positions; a pair of return members carried by said switching member and located on opposite sides of said steering means, one of said return members being movable with said switching member in response to movement of the latter from its neutral position to one of its operating positions and into the path of one of said cam means; and cooperable indexing means comprising a first part on each of said cam means and a second part on said switching member, said first and second parts being engageable with one another in response to movement of said switching member to either of its operating positions, the engagement of said first and second parts of said indexing means conditioning said one of said cam means for movement into engagement with said return means and restoration of said switching member to said neutral position.

8. Directional signaling apparatus for use with a rotatable steering member having a first cam member fixed thereon for rotation therewith, said apparatus comprising a second cam member; unidirectional clutch means mounting said second cam member adjacent said steering member for rotation therewith and for rotation in one direction relative to said steering member; actuating means having a return member thereon; means mounting said actuating means for movements from a neutral position in which said return member is clear of the path of rotation of said cam members to an operating position in which said return member is located in the path of said cam members; and cooperable ratchet means on said actuating means and on said second cam member, the ratchet means on said second cam member being engageable with the ratchet means on said actuating means when the latter is in its said operating position, the engagement of the ratchet means of the second cam member with the ratchet means of said actuating means being operable to effect relative rotation between said steering member and said second cam member toward the return member.

References Cited by the Examiner
UNITED STATES PATENTS 2,542,242   2/51   Fuller _____ 200—61.34
3,020,774   2/62   Kullman _____ 74—142

BERNARD A. GILHEANY, Primary Examiner.